June 11, 1935.  E. BUGATTI  2,004,850

SEAT FOR USE IN ROAD OR RAIL VEHICLES

Filed Nov. 21, 1933

Inventor:
Ettore Bugatti
by Mauro & Lewis
Attorneys

Patented June 11, 1935

2,004,850

UNITED STATES PATENT OFFICE 2,004,850

SEAT FOR USE IN ROAD OR RAIL VEHICLES

Ettore Bugatti, Molsheim, France

Application November 21, 1933, Serial No. 699,071
In France November 28, 1932

5 Claims. (Cl. 155—99)

The object of the present invention is to provide a seat that is more especially intended for use in road or rail vehicles, said seat being adapted to be used in opposite directions.

To this effect, according to my invention, the back of the seat, which is padded only on one side, and the cushion, or portion of the seat that is to be sat upon are mounted on a common frame, in such manner that it is possible, by displacing the back, or the back and the cushion, with respect to said frame, which is stationary, to tip the seat toward the front or toward the rear of the vehicle.

According to a first embodiment of my invention, the back may occupy either of two symmetrical positions, one at the front and the other at the rear of a cushion of uniform thickness. The change of position is performed either by fully removing the back and engaging it on the other side in suitable guiding organs, or by causing its support or frame to pivot in the frame of the seat and by turning the padding so as to bring it into the desired position.

Advantageously, the cushion may rest on bent supports, symmetrically disposed in the frame of the seat, thus permitting to give said cushion an inclined position, in one direction or the opposite one, similar to that of the cushion of an arm-chair.

According to another embodiment of the present invention, the back and the seat are rigidly connected together through adjustable means permitting the adjustment of the angle that they make with each other. With this embodiment of the invention, one of these parts is utilized as the seat proper when the whole is turned in one direction and as the back when the whole is turned in the opposite direction, fixation organs being provided for maintaining these elements on the frame that carries the arms.

Preferred embodiments of the present invention will be hereinafter described with reference to the accompanying drawing, given merely by way of example, and in which.

Figure 1:
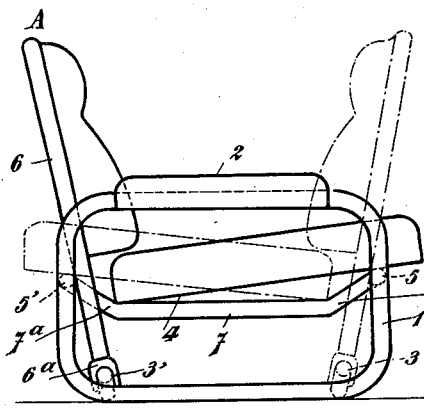
Figs. 1 and 2 are a side elevational view and a front view, respectively, of a seat according to the present invention.
Figure 2:
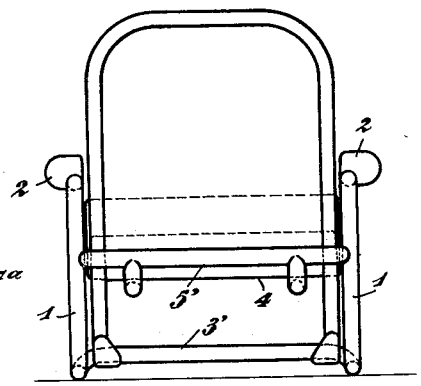

The seat according to the present invention and shown in the drawing comprises a support consisting of two lateral frames 1, which carry the arms 2 of the seat and are connected together by cross members 3, 3' located close to the ground and other cross members 5, 5' located at the level of cushion 4, (Figs. 1 and 2).

The back 6 consists of a frame which is provided at its lower end with forks 6ª which may engage either on cross member 3 or on cross member 3'. This back, which is padded only on one side 9, is therefore kept in position on the one hand by one of the cross members 3, 3', on which is engaged each of these forks 6ª, and on the other hand by one of the cross members 5, 5' on which rests said frame 6 (see for instance the position shown in solid lines in Fig. 1).

The rear portion of cushion 4 rests on longitudinal supports 7 bent at their ends at 7ª while the front part of said cushion rests on the other upper cross member 5. These cross members 5 and 5' also serve to the fixation of supports 7. It will be noted that, with this arrangement, the cushion is inclined as in an arm-chair.

In order to pass from the position A (shown in solid lines) into the position B (shown in dotted lines), frame 6 must be removed from between frames 1 and turned through an angle of 180° about a vertical axis. After pushing cushion 4, the forks 6ª of frame 6 are engaged on cross member 3 and frame 6 is caused to rest against cross member 5, while the cushion, by sliding along the inclined portions of supports 7, is brought into the proper inclined position, so as to assume the position shown in dotted lines in Fig. 1.

Figure 3:
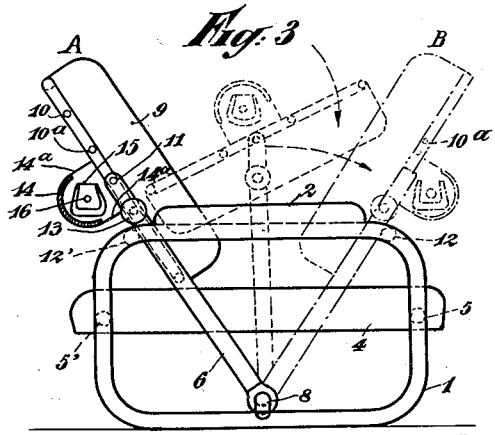
Figs. 3 and 4 are similar views of another embodiment in which the back of the seat is pivoted in the frame.
Figure 4:
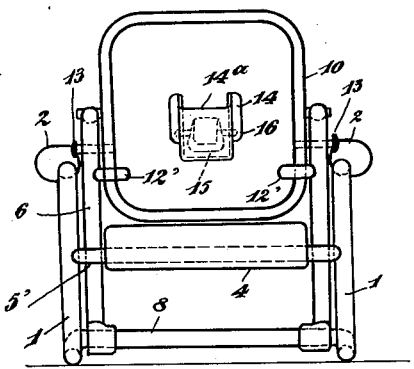

In Figs. 3 and 4 I have shown another embodiment of my invention according to which cushion 4 is fixed in the frame by means of cross members 5, 5', while the frame 6 of the back pivots about a cross member 8 fixed in the middle part of the frame 1, close to the ground.

In order to pass from position A (shown in solid lines) into position B (shown in dotted lines), it suffices to push frame 6, by causing it to pivot about cross member 8, into contact with stops 12. Simultaneously, the frame 10 that carries the padding 9 of the back is caused to pivot, through an angle of 180° (in the direction of arrow f) about trunnions 11 and it is locked in the position shown at B by means of spring mounted fingers 13 engaging in holes 10ª of frame 10.

The back of this seat may be provided with a small support 14 within which may be mounted an ash tray 15 which pivots at the same time as the back itself. This ash tray may be so arranged that it is accessible through one of the apertures 14ª provided in support 14 on either side of said ash tray. To this effect, the ash tray is pivoted about an axis 16.

Figure 5:
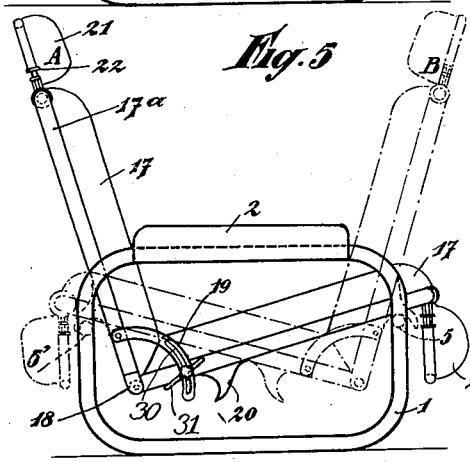
Figs. 5 and 6 are a side view and a front view, respectively, of a seat comprising two elements assembled together and each of which acts as the seat proper when the whole is turned in one direction and as the back when the whole is turned in the opposite direction.
Figure 6:
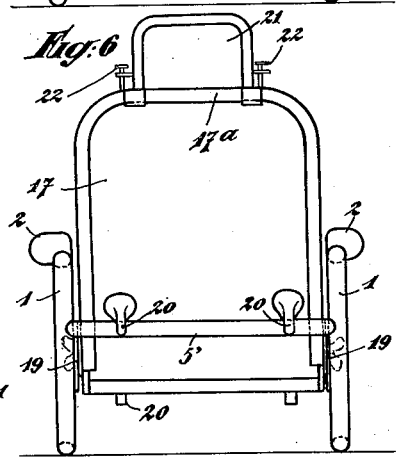

Finally, in the embodiment shown in Figs. 5 and 6, the back and the cushion consist of two identical padded elements 17, hinged to each other at 18 and maintained in the proper relative position by means of sectors 19. On their sides opposed to the padding, these elements are provided with hooks 20, so that the element 17 that forms the back may be fixed to the upper cross member 5' of the seat frame, for instance, while the element 17 that forms the seat proper simply rests on the other upper cross member 5 (Fig. 5).

In order to pass from position A (shown in solid lines in Fig. 5) to position B (shown in dotted lines in the same figure), it suffices to hook the element 17 that previously formed the seat on cross member 5, the element 17 that formed the back now resting on cross member 5', so as to now constitute the seat proper.

In this case, I may also provide a head rest 21, pivoted to the frame 17ª of each element 17. This element is locked in either of its positions of utilization by means of locking members 22. I might also provide in this case an ash tray similar to that shown in the embodiment of Figs. 3 and 4.

Advantageously, the sectors 19 that serve to angularly fix to each other elements 17 are adapted to vary the angular position of said elements with respect to each other. For instance these sectors 19 are each provided with a circular slot 30 through which extends a threaded rod carried by the frame members 17a of one of the elements 17 and on which is screwed a nut 31 which serves to fix these two elements 17 in any desired angular relation with respect to each other.

As for the locking of the pivoting portions it may be obtained through any suitable means.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. A seat of the type described which comprises, in combination, a supporting frame including two horizontal members disposed in parallel relation to each other both at substantially the same level above the bottom of the frame, a seat unit consisting of two elements making a given angle with each other and rigidly assembled together, and at least one hook carried by the outer face of at least one of said elements, adapted to pivotally engage on either of said horizontal members, the other element then resting on the other horizontal member, whereby the seat can be fixed in either of two opposed positions in said frame.

2. A seat of the type described which comprises, in combination, a supporting frame including two horizontal members disposed in parallel relation to each other both at substantially the same level above the bottom of said frame, a seat unit consisting of two elements making an angle with each other, adjustable means for rigidly assembling said seat elements together, and at least one hook carried by the outer face of at least one of said elements, adapted to pivotally engage on either of said horizontal members, the other element then resting on the other horizontal member, whereby the seat can be fixed in either of two opposed positions in said supporting frame.

3. A seat of the type described which comprises, in combination, a supporting frame including two horizontal members disposed in parallel relation to each other both at substantially the same level above the bottom of the frame, a seat unit consisting of two elements making a given angle with each other and rigidly assembled together, and at least one hook carried by the outer face of each of said elements, adapted to pivotally engage on either of said horizontal members, the other element then resting freely on the other horizontal member, whereby the seat can be fixed in either of two opposed positions in the supporting frame.

4. A seat of the type described which comprises, in combination, a supporting frame including two horizontal members disposed in parallel relation to each other both at substantially the same level above the bottom of said frame, a seat unit consisting of two elements making an angle with each other, adjustable means for rigidly assembling said seat elements with each other, and at least one hook carried by the outer face of each of said elements, adapted to pivotally engage on each of said horizontal members, the other element then resting freely on the other horizontal member, whereby the seat can be fixed in either of two opposed positions in the supporting frame.

5. A seat according to claim 3 further including an additional section pivoted to each of said seat elements about an axis parallel to its free edge, and means for locking said additional section in proper angular position with respect to the corresponding seat element.

ETTORE BUGATTI.